Feb. 18, 1941.  E. KRIESE ET AL  2,232,538
VALVE
Filed Jan. 13, 1939
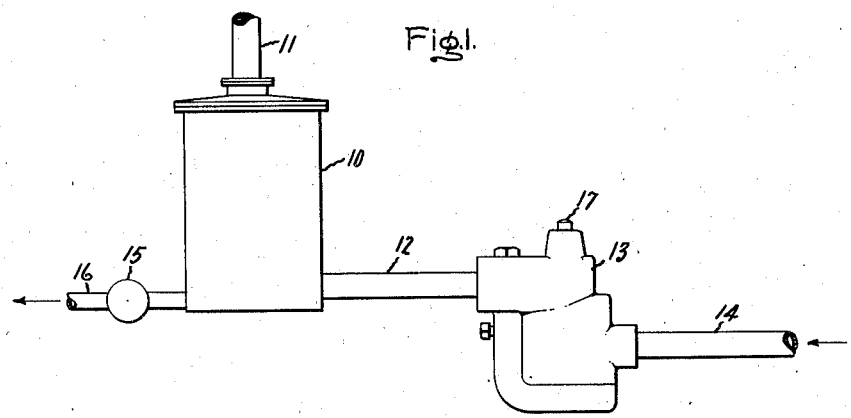
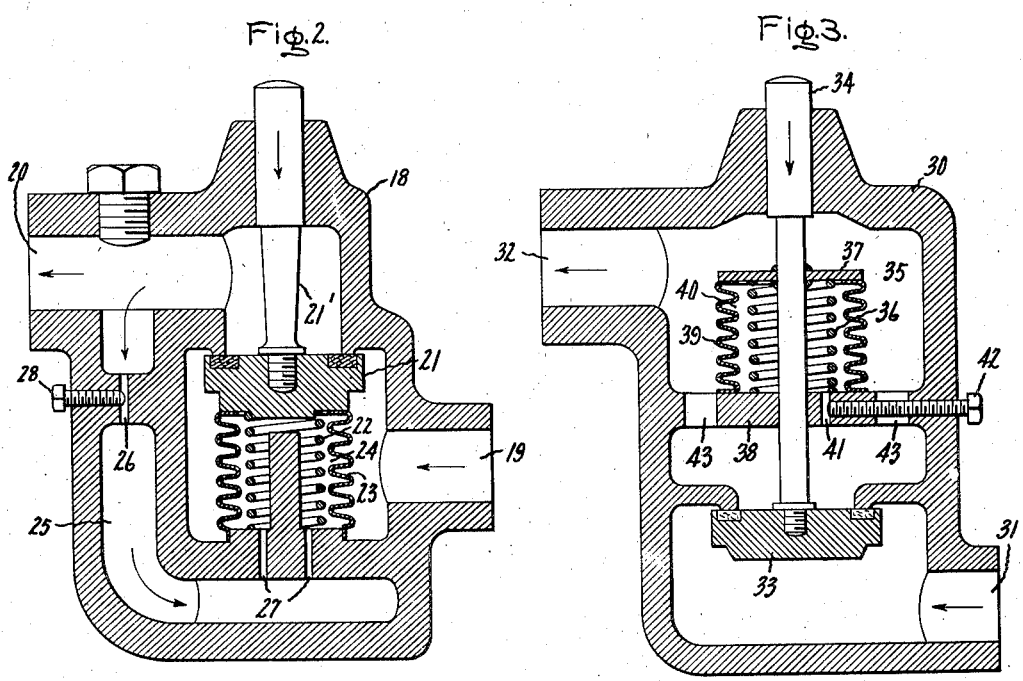
Inventors:
Erwin Kriese,
Hubert Korndörfer,
by Harry E. Dunham
Their Attorney.

Patented Feb. 18, 1941

2,232,538

UNITED STATES PATENT OFFICE 2,232,538

VALVE

Erwin Kriese, Berlin-Lichtenberg, and Hubert Korndörfer, Berlin, Germany, assignors to General Electric Company, a corporation of New York Application January 13, 1939, Serial No. 250,858
In Germany January 22, 1938

1 Claim. (Cl. 251—138)

This invention relates to pressure fluid distributing valves and more particularly to valves which are adapted to be operated to the opened position by an externally applied force and are automatically reclosed after a predetermined time delay.

Pressure fluid control valves arranged for automatic reclosing with time delay characteristics generally embody more or less complicated mechanisms which are subject to faulty operation. Aside from high initial cost, the necessity for frequent repair and replacement of parts have rendered the valves of known designs unsuitable where reliability and uninterrupted service is of prime importance.

It is an object of this invention to provide a new and improved control valve of the type referred to which has relatively few movable parts, is simple in design and reliable in operation.

It is a further object of this invention to provide a new and improved control valve which is manually operable to the opened position, maintained in the opened position by an unbalance of forces exerted by the flow of fluid therethrough, and automatically reclosed after a predetermined time delay.

In the illustrated embodiments of this invention, a valve is provided with a disk which is biased to the closed position. An expansible bellows arrangement is operatively associated with the disk which when the disk is moved to the opened position effects an unbalance of fluid pressure acting upon the disk whereby it is held opened against the biasing means. Pressure fluid is admitted into the bellows chamber through an adjustable orifice from the discharge side of the valve whereby the pressure acting upon the disk is gradually balanced allowing the disk to close under the force of the biasing means.

For a consideration of what we believe to be novel and our invention, attention is directed to the following description and the claim appended thereto taken in connection with the accompanying drawing.

In the drawing Fig. 1 illustrates a typical pressure fluid operating system embodying a control valve of the type herein described; Fig. 2 is a cross-sectional elevation through one modification of a valve according to this invention; while Fig. 3 illustrates a second modification.

In certain pressure fluid operating systems, such as for operating heavy duty circuit breakers, a valve is provided for controlling the flow of operating fluid, such as compressed air, to the actuating servo motor until it is moved to a predetermined position. Upon reaching such position as upon the completion of the circuit breaker closing operation, it is desirable that the valve should automatically cut off the supply of pressure fluid from the servo motor so that it may be immediately returned to the inoperative position in readiness for a second operating cycle.

In a typical pressure fluid operating system shown in Fig. 1, 10 is a fluid pressure actuating means or servo motor of a well-known form having an operating rod 11 extending therefrom for performing any suitable operation, such as the closing of an electric circuit breaker (not shown.) Pressure fluid, such as compressed air, is supplied to the servo motor 10 through the inlet connection 12 having a valve 13 therein for controlling the supply of pressure fluid from a suitable source (not shown) through the conduit 14. A valve 15 arranged in the discharge conduit 16 controls the discharge of pressure fluid from the cylinder of the servo motor. Assuming first that the servo motor 10 is in the inoperative position and it is desired to energize the motor, the valve 15 is first closed and the push button 17 of the valve 13 is depressed whereby pressure fluid from the source is admitted to the cylinder of the servo motor. When the piston of the servo motor has reached its limit of travel and pressure builds up therein substantially equal to the supply pressure, the valve 13 is automatically operated to the closed position, the servo motor 10 being maintained in the operated condition by the volume of fluid within its cylinder. The servo motor may be tripped to the inoperative position by any suitable means arranged for opening the discharge valve 15 in response to any predetermined condition.

The fluid pressure supply controlling valve 13, according to our invention, is illustrated in detail in one form in Fig. 2 in which the valve housing 18 is shown having inlet and outlet passages 19 and 20 respectively. A valve disk 21 is arranged within the inlet chamber and biased to the seating position by means of the spring 22 arranged between the inlet side of the disk and the lower housing wall. One end of a flexible bellows member 23 is secured to the inlet side of the valve disk 21 substantially around the periphery thereof and the other end to the lower housing wall forming a fluid-tight chamber 24 having a mean diameter substantially equal to the seating diameter of the valve disk. Since the valve inlet side of the disk is protected from the fluid pressure of the source, the disk is normally retained in the seated position primarily by the biasing force of spring 22. A passage 25 in communication with the outlet chamber of the valve through the restricted opening 26 extends around the valve housing and further communicates with the chamber 24 within the bellows member through openings 27. By means of the adjusting valve 28 arranged in the restricted opening 26, the rate of pressure fluid flow into the chamber 25 may be regulated to attain the desired time delay characteristic for the valve closing operation. The housing or casing has a projection disposed within the chamber 24 to center the spring 22 and to act as a stop limiting opening movement of the valve 21 and thereby also to prevent excessive compression of the bellows 23. The valve disk is adapted to be actuated to the opened position by means of the push rod 21' which extends through the housing and is secured to the outlet side of the disk. In the operation of the valve when the disk 21 is unseated and pressure fluid admitted to the servo motor, the pressure acting on the outlet side of the valve disk will maintain it open against the bias of the spring 22. Pressure fluid will flow through the restricted opening 26 and through the openings 27 into the interior of the bellows chamber 24, the rate of flow being relatively slow, however, due to the relatively low pressure obtaining in the valve outlet passage 20. As soon as the piston of the servo motor 10 reaches its 'imit of travel, the pressure at the discharge side of the valve will become substantially equal to the pressure of the supply and the rate of fluid flow through the passage 26 into the bellows chamber 24 will increase. Upon the equalization of the fluid pressure forces acting upon the opposite sides of the disk, the biasing spring 22 will actuate the valve disk to the closed position where it will remain until the next operation.

If in the event that the valve 15 controlling the discharge from the cylinder of the servo motor 10 was not first closed before the button 17 was depressed, as an indication that some phase of the system was not in readiness for the energization of the motor 10, the pressure fluid would discharge through conduit 16 with no effect as regards the operation of the servo motor 10. Under such conditions the fluid flowing through the passage 26 will within a predetermined length of time, as determined by the setting of the valve 28, build up the pressure within the bellows chamber 24 substantially equal to the pressure acting upon the opposite side of the disk whereupon the valve disk will be moved to the closed position preventing the continuous passage of operating fluid therethrough. This length of time, however, is such that during the normal operation of the system, the valve will remain open at least until the piston of the servo motor has had full opportunity to reach its limit of travel.

In Fig. 3 is shown a second modification of the invention in which a valve housing 30, having inlet and outlet passages 31 and 32, respectively, is provided with a valve disk 33 secured to the end of the push rod 34 extending through the discharge chamber 35. The valve disk is biased to the closed position by the spring 36 arranged between a disk 37 secured to the push rod 34 and a wall 38 extending across the discharge chamber 35. A flexible bellows 39 having one end sealed to the periphery of the disk 37 and the other end to the wall 38 forms a substantially fluid-tight chamber 40 except for the passage 41 through the wall 38 communicating with the exhaust chamber 35. An adjustable valve 42 controls the rate of pressure fluid flow through the opening 41 into the bellows chamber. It will be noted that openings 43 are provided in the wall 38 allowing free flow from the main valve opening to the outlet 32 around the sides of the bellows member 39.

The operation of the valve according to the second modification is substantially similar to that previously described. When the valve disk is actuated to the open position by the depression of the push rod against the bias of the spring 37, the disk 33 is maintained in the opened position by virtue of the unbalance of the fluid pressure acting upon the valve disk resulting from the low pressure obtaining within the bellows chamber 40. The pressure acting upon the exposed, or outer, surface of the disk 37 exerts a force upon the push rod 34 in opposition to the force acting upon the inlet side of the valve disk 33 and in the same direction as the force acting upon the opposite side of the valve disk. After a predetermined time limit when the pressure within the bellows chamber 40 builds up substantially equal to the pressure exteriorly thereof, the disk 33 will be closed by action of the spring 37.

Having described the principle of operation of our invention together with the apparatus which we now consider to represent the best embodiment thereof, we desire to have it understood that the apparatus shown is only illustrative and that the invention may be carried out by other means.

What we claim as new and desire to secure by Letters Patent of the United States is:

A pressure fluid controlling valve comprising a housing having inlet and outlet passages, a valve disk arranged between said passages and adapted to be actuated to the opened position in the direction of said inlet passage, a flexible bellows member having a mean diameter substantially equal to the seating diameter of said disk secured at one end to the periphery of said disk at the valve inlet side thereof, the other end of said bellows member being sealed to an adjacent wall of said valve housing, a spring arranged within said bellows member between said housing wall and said disk for biasing said disk to the closed position, the casing having a projection disposed within the chamber to center the spring and to limit opening movement of the valve disk, a push rod extending through said valve housing and secured to the outlet side of said valve disk whereby said disk may be operated to the opened position, a passage formed by the housing and communicating with the valve outlet passage and with the interior of said bellows member, and means for regulating the rate of fluid flow from said valve outlet passage into said bellows member.

ERWIN KRIESE.
HUBERT KORNDÖRFER.